United States Patent
Hu

(10) Patent No.: US 10,132,514 B2
(45) Date of Patent: Nov. 20, 2018

(54) AIRFLOW BOOSTING ASSEMBLY FOR A FORCED AIR CIRCULATION AND DELIVERY SYSTEM

(71) Applicant: Sine Kon Hu, Toronto (CA)

(72) Inventor: Sine Kon Hu, Toronto (CA)

( * ) Notice: Subject to any disclaimer, the term of this patent is extended or adjusted under 35 U.S.C. 154(b) by 44 days.

(21) Appl. No.: 14/510,833

(22) Filed: Oct. 9, 2014

(65) Prior Publication Data

US 2015/0024675 A1 Jan. 22, 2015

Related U.S. Application Data

(63) Continuation of application No. 12/458,907, filed on Jul. 27, 2009, which is a continuation-in-part of application No. 11/686,692, filed on Mar. 15, 2007, now Pat. No. 7,566,262.

(30) Foreign Application Priority Data

Mar. 7, 2007 (CA) ..................................... 2581241

(51) Int. Cl.
| | |
|---|---|
| F24F 7/06 | (2006.01) |
| F24F 7/007 | (2006.01) |
| F24F 13/08 | (2006.01) |
| F24F 11/30 | (2018.01) |
| F24F 110/10 | (2018.01) |

(52) U.S. Cl.
CPC .............. *F24F 7/007* (2013.01); *F24F 7/065* (2013.01); *F24F 11/30* (2018.01); *F24F 13/08* (2013.01); *F24F 13/082* (2013.01); *F24F 2110/10* (2018.01)

(58) Field of Classification Search
CPC .......... F24F 13/082; F24F 7/007; F24F 7/065; F24F 11/0012; F24F 13/08
USPC ...... 454/329; 416/187, 194, 195, 219 R, 222
See application file for complete search history.

(56) References Cited

U.S. PATENT DOCUMENTS

| | | | |
|---|---|---|---|
| 2,825,500 | A | 3/1958 | McLean |
| 3,013,714 | A | 12/1961 | Smith et al. |
| 3,099,201 | A | 7/1963 | Gottlieb |
| 3,219,261 | A | 11/1965 | Laing |

(Continued)

FOREIGN PATENT DOCUMENTS

| | | | |
|---|---|---|---|
| EP | 0178645 A1 * | 4/1986 | ............. F04D 17/04 |
| JP | 63280892 A | 11/1988 | |

(Continued)

*Primary Examiner* — Gregory Huson
*Assistant Examiner* — Frances F Hamilton

(57) ABSTRACT

The invention relates generally to the field of airflow boosting devices. In particular, the invention relates to a booster fan for installation into a vent opening of a duct system in a forced air circulation and delivery system. In an embodiment, the booster fan includes a register plate for covering a vent opening. An opening or openings on the register plate provide an air outlet. A housing is secured to the register plate for enclosing a crossflow fan therein. The crossflow fan is disposed adjacent and spaced from the register plate and resiliently supported at both ends. A motor is resiliently connected to the crossflow fan. The housing also has an aperture for providing an air inlet communicating with the duct system. Preferably, two arcuate air deflection panels are provided in the housing for connecting the air inlet and air outlet to form a guided air passageway.

18 Claims, 7 Drawing Sheets

(56) References Cited

U.S. PATENT DOCUMENTS

| | | | |
|---|---|---|---|
| 3,854,489 A | 12/1974 | Doyle et al. | |
| 3,940,215 A * | 2/1976 | Hori | F04D 17/04 |
| | | | 415/143 |
| 3,977,062 A * | 8/1976 | Wallman | F04D 29/283 |
| | | | 29/33 K |
| 4,002,109 A * | 1/1977 | Hori | F04D 17/04 |
| | | | 415/53.3 |
| 4,007,999 A * | 2/1977 | Serizawa | F04D 29/283 |
| | | | 416/178 |
| 4,105,015 A * | 8/1978 | Isom | F24C 15/2021 |
| | | | 126/299 D |
| 4,211,365 A * | 7/1980 | Friedl | B60H 1/2203 |
| | | | 237/12.3 C |
| 4,235,568 A * | 11/1980 | Zenkner | F04D 29/283 |
| | | | 416/187 |
| 4,722,266 A | 2/1988 | Deckert | |
| 4,754,697 A | 7/1988 | Asselbergs | |
| 4,775,001 A | 10/1988 | Ward et al. | |
| 4,809,593 A | 3/1989 | Asselbergs | |
| 4,846,399 A | 7/1989 | Asselbergs | |
| 5,083,909 A | 1/1992 | Kunsemiller et al. | |
| 5,207,561 A * | 5/1993 | Godichon | F04D 29/263 |
| | | | 416/134 R |
| 5,489,238 A | 2/1996 | Asselbergs | |
| 5,632,677 A | 5/1997 | Elkins | |
| 6,159,093 A * | 12/2000 | Mihalko, III | F24F 7/025 |
| | | | 454/341 |
| 6,210,114 B1 * | 4/2001 | Kim | F04D 29/283 |
| | | | 416/178 |
| 6,326,882 B1 | 12/2001 | Chiu et al. | |
| 6,837,677 B2 * | 1/2005 | Zhang | F04D 29/167 |
| | | | 415/174.3 |
| 6,945,868 B2 * | 9/2005 | Gautney | F24F 5/0035 |
| | | | 312/100 |
| 6,990,825 B2 | 1/2006 | Hansen | |
| 7,455,583 B2 * | 11/2008 | Taya | F24F 7/06 |
| | | | 454/229 |
| 7,566,262 B2 * | 7/2009 | Hu | F24F 7/007 |
| | | | 454/284 |
| 2002/0096953 A1* | 7/2002 | Shingai | B29C 45/26 |
| | | | 310/90 |
| 2006/0199515 A1* | 9/2006 | Lasko | F24F 7/065 |
| | | | 454/237 |
| 2007/0129001 A1* | 6/2007 | Orr | F24F 11/0001 |
| | | | 454/239 |

FOREIGN PATENT DOCUMENTS

| | | | |
|---|---|---|---|
| JP | 05263784 A | | 10/1993 |
| JP | 05300715 A | * | 11/1993 |
| JP | 0908874 | * | 3/1997 |
| JP | 09158894 A | | 6/1997 |
| JP | 2001065490 A | * | 3/2001 |
| JP | 2005207708 A | * | 8/2005 |

* cited by examiner

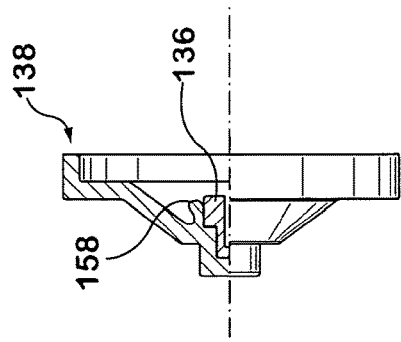
FIG.5
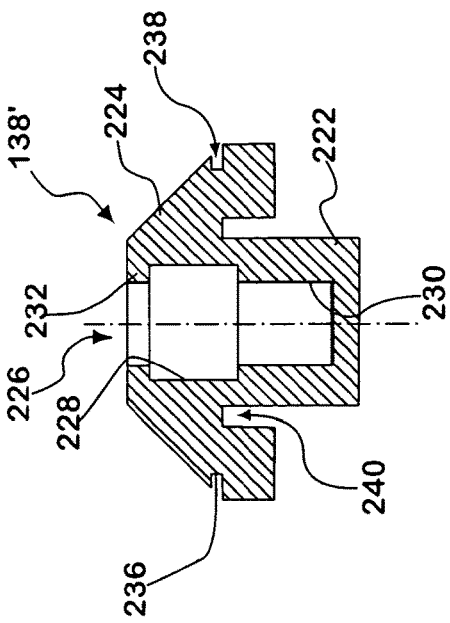
FIG.4B
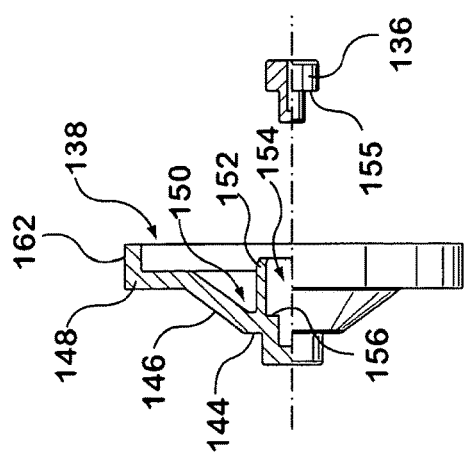
FIG.4
FIG.4A

AIRFLOW BOOSTING ASSEMBLY FOR A FORCED AIR CIRCULATION AND DELIVERY SYSTEM

CROSS-REFERENCE TO RELATED APPLICATIONS

This application is a continuation of application Ser. No. 12/458,907, which is a continuation-in-part of application Ser. No. 11/686,692, now U.S. Pat. No. 7,566,262, which claims priority from Canadian Patent Application No. 2,581,241 for "Airflow Boosting Assembly for a Forced Air Circulation and Delivery System" filed on Mar. 7, 2007, all of which is hereby incorporated by reference.

FIELD OF INVENTION

The invention relates generally to the field of airflow boosting devices. In particular, the invention relates to a booster fan for installation into a vent opening of a duct system in a forced air circulation and delivery system.

BACKGROUND OF INVENTION

Modern residential buildings are often equipped with a central air circulation and delivery system, which utilizes an air blower fan to force air into individual rooms through an air delivery duct system in the buildings. When the circulated air is heated or cooled or otherwise conditioned, circulation of the air inside a building also provides heating or cooling of ambient temperature or otherwise conditioning of air in the building or individual rooms thereof. It is desirable that each room is heated, cooled or otherwise conditioned according to user selectable criteria for the comforts of the room's occupants.

Such a centralized air circulation and delivery system, however, does not always provide satisfactory results. For example, in a residential building, the air blower may be installed in a basement while a bedroom may be two or three floors up. An air blower fan may not be sufficiently powerful to deliver the desired volume of air to such a bedroom, thereby may not be able to heat or cool the room to the desired temperature. In addition, distances from different rooms to the air blower fan are generally different. The duct system may not be always designed to compensate for the different lengths of duct paths to reach individual rooms, with the result of uneven distribution and delivery of air in individual rooms in a building. To compensate, people tend to set temperature a little higher (in the winter) or a little lower (in the summer) for the entire building so that they may feel comfortable in the room or rooms with insufficient air delivery. This generally wastes energy.

Traditionally, damper balancing has been used to balance air delivery. Air is discharged into each room through a vent or vents. A damper is provided near each vent for controlling the air supply to the vent. Thus, a damper may be used to partially close off or otherwise reduce or restrict airflow to rooms with stronger air delivery while leaving the dampers fully open in a duct or ducts leading to other rooms that require more air delivery, thus achieving a more balanced delivery of air to all rooms. Each vent may be further equipped with an adjustable register, which is provided with louvers. Adjusting the louvers can further control volume of airflow through the register. This solution does not provide a satisfactory solution. Dampers are generally located some distance away from vents or may be hidden behind floor or wall coverings and therefore difficult to reach. Restricting or reducing air flow at some vents generally reduces the efficiency of the entire air delivery system. Air flow at other vents is not necessarily increased, or increased proportionally as a result of the reduction at the closed off or blocked vents. The efficiency of the air circulation and delivery system tends to be reduced as a result. More importantly, restricting air flow in some rooms results in air not being sufficiently circulated in these rooms. Sometimes, this may also produce the undesirable result of whistling at vents that are almost entirely closed off.

There have been other solutions proposed based on a booster fan installed over a register. Typically, such a booster fan has a housing enclosing a fan inside. For example, U.S. Pat. No. 4,846,399 discloses a register booster fan for increasing the flow of air through a register. U.S. Pat. No. 5,489,283 discloses another register booster fan that includes a centrifugal fan for drawing air from the register and redirecting air horizontally outwardly through side vents of the booster fan. These booster fans rest on a register with its air inlet facing the register. The fan directs air upwardly and draws air from the register, thereby increasing the air flow through the register. However, this solution is not entirely satisfactory. Such a booster fan, resting above a register, may create an obstacle on the floor. Being positioned on top of a register, it may also alter a room's otherwise aesthetic appearance. In addition, such a booster fan requires good sealing between the booster fan and the register in order to maintain a negative air pressure at the register for drawing air from the register and for avoiding ambient air being drawn into the booster fan and re-circulated.

There have also been proposals of in-line air duct booster fans. A booster fan of this type is generally installed in an air duct for increasing the air flow along a duct. However, an air duct may be used for delivering air into several different rooms, not all of which require a booster. Increasing air flow in a duct may cause further imbalance of air delivery in individual rooms. There have also been booster fans proposed that are installed in a vent opening directly under a register. For example, U.S. Pat. No. 5,632,677 discloses a fan-equipped vent for installation in a vent opening under a register. The fan-equipped vent has a housing that fits inside a typical vent opening in a residential building and encloses one or several fans. As the fan-equipped vent has to fit within the available space of a typical vent opening, the size of a fan or fans used inside the housing is more restricted. This size limit tends to limit the ability of fans to move air. To compensate, more than one fan or increased fan speed is generally required. This tends to increase the noise level and may disturb the occupant's quiet enjoyment in a room. As more fans are used within a confined space, they may also obstruct air flow, which may partially defeat the purpose of installing such a booster fan.

There is therefore a need for an improved booster fan for use in a central air circulation and delivery system. It is an object of the present invention to mitigate or obviate at least one of the above mentioned disadvantages.

SUMMARY OF INVENTION

The present invention is directed to an airflow boosting assembly. In particular, the invention relates to a booster fan for installation into a vent opening of a duct system in a forced air circulation and delivery system.

In an embodiment, the booster fan includes a register plate for covering a vent opening. An opening or openings on the register plate provide an air outlet. A housing is secured to the register plate for enclosing a crossflow fan therein. The housing is dimensioned to be smaller than the vent opening for passing therethrough. The crossflow fan is disposed adjacent and spaced from the register plate and resiliently supported at both ends. A motor is resiliently connected to the crossflow fan in a driving relation. The housing also has an aperture for providing an air inlet communicating with the duct system. Preferably, two arcuate air deflection panels are provided in the housing and connecting the air inlet and air outlet to form a guided air passageway.

In a first aspect of the invention, there is provided an airflow boosting assembly for installation in a vent opening of a forced air circulation and delivery system. The airflow boosting assembly includes a register plate for covering the vent opening, the register plate having defined therein an air outlet; a housing, the housing having an air inlet spaced from the air outlet, the housing being dimensioned to be smaller than the vent opening for passing therethrough; a crossflow fan disposed between the air inlet and the air outlet, the crossflow fan having a rotational axis, the crossflow fan being oriented such that the rotational axis is generally parallel to the register plate; an elastomeric motor connector; a motor secured to the housing, the motor being connected to the crossflow fan in a driving relation through the elastomeric motor connector; an elastomeric bearing housing attached to the housing and a bearing resiliently housed in the bearing housing; the crossflow fan having a shaft rotationally supported in the bearing, the bearing housing biasing the crossflow fan toward the motor along a direction generally parallel to the rotational axis; and a control circuitry for selectively energizing the motor.

In a second aspect, there is provided an airflow boosting assembly for installation in a vent opening of a forced air circulation and delivery system. The airflow boosting assembly includes a register plate for covering the vent opening, the register plate having defined therein an air outlet; a housing, the housing having a bottom wall spaced from the register plate, the bottom wall having defined thereon an air inlet, the housing being dimensioned to be smaller than the vent opening for passing therethrough; a crossflow fan disposed between the air inlet and the air outlet, the crossflow fan having a rotational axis, the crossflow fan being oriented such that the rotational axis is generally parallel to the register plate, the crossflow fan having a motor end disc, a bearing end disc, a plurality of fan blades extending between and connected to the motor end disc and the bearing end disc and a shaft extending from the bearing end disc; a motor secured to the housing and an elastomeric motor connector; the motor having a spindle and the elastomeric motor connector rotationally connecting the spindle to the motor end disc in a driving relation; a bearing having an insert hole for receiving the shaft; a bearing housing bracket secured to the housing; an elastomeric bearing housing resiliently attached to the bearing housing bracket; the bearing resiliently received in the bearing housing, the bearing housing biasing the crossflow fan toward the motor in a direction generally parallel to the rotational axis; and a control circuitry for selectively energizing the motor.

In one feature of this aspect of the invention, the bearing housing has a bowl-like profile, the bowl-like profile having a raised column formed on a bottom region of the bowl-like profile, the raised column having a receiving hole for receiving the bearing, the raised column being deformable to grip the bearing upon the bearing being urged toward the bottom region.

In another feature of this aspect of the invention, the bearing is made of a hard synthetic resin material and the insert hole has a low friction surface.

In yet another feature of this aspect of the invention, the motor end disc has a non-circular opening defined therein for receiving the motor connector, the motor connector having an external profile matching the non-circular opening.

In another feature of this aspect of the invention, the air boosting device, further includes a first arcuate guidance panel and a second arcuate guidance panel, the first and second guidance panels being disposed between the register plate and the bottom wall to form a guided air passageway between the air inlet and the air outlet, the first guidance panel being curved to embrace the crossflow fan and the second guidance panel being curved away from the crossflow fan.

In other aspects the invention provides various combinations and subsets of the aspects described above.

BRIEF DESCRIPTION OF DRAWINGS

For the purposes of description, but not of limitation, the foregoing and other aspects of the invention are explained in greater detail with reference to the accompanying drawings, in which:

FIG. 4 shows in a partial sectional view a bearing and a bearing housing for supporting a crossflow fan in the booster fan shown in FIG. 1;

FIG. 4A is a front view showing an alternative bearing for supporting a crossflow fan;

FIG. 4B shows in a side sectional view an alternative bearing housing;

FIG. 5 shows in a partial sectional view the bearing received in the bearing housing shown in FIG. 4;

DETAILED DESCRIPTION OF EMBODIMENTS

Figure 1:
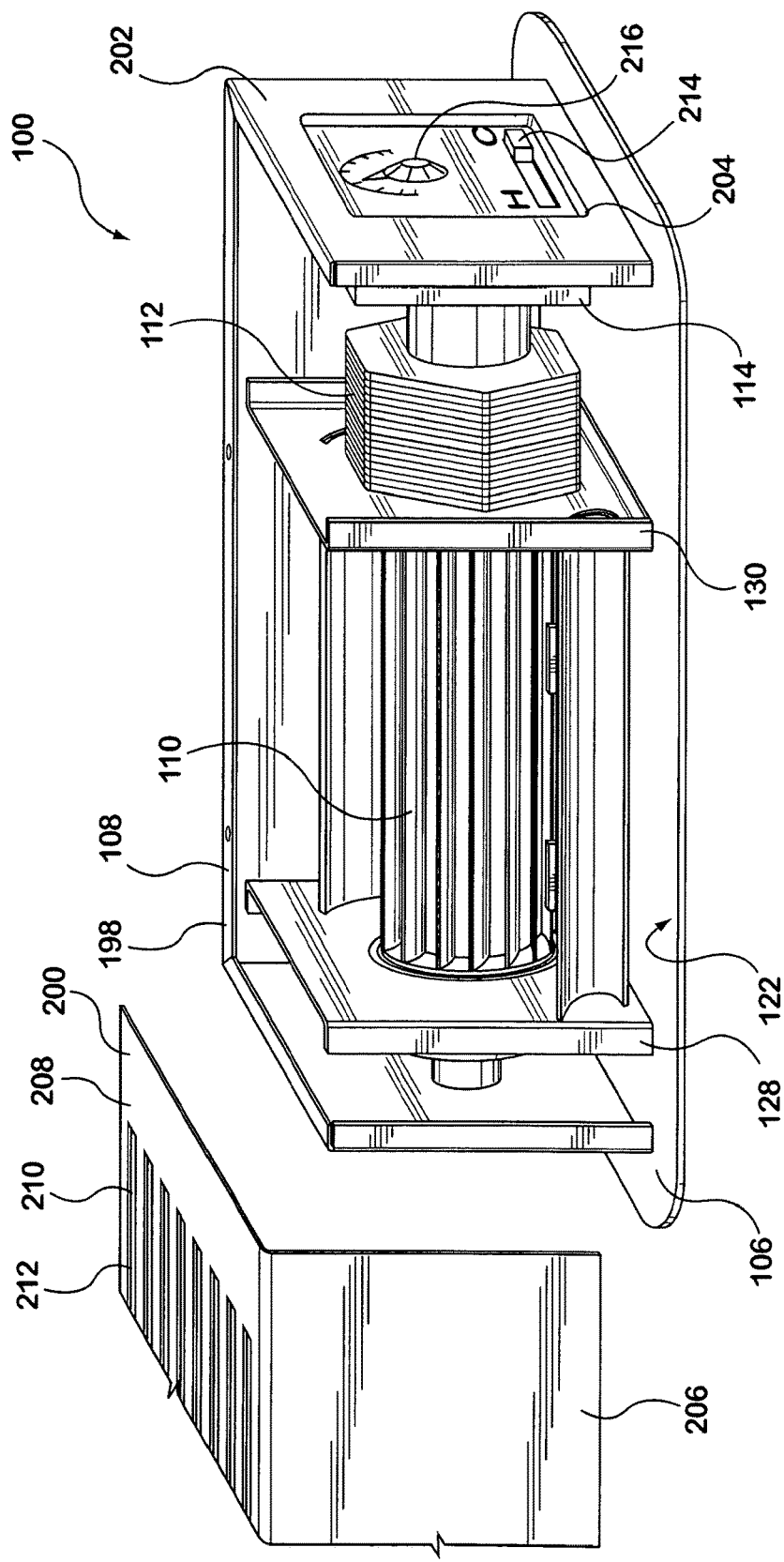
FIG. 1 is a perspective view of a booster fan according to an embodiment of the present inventions.

The description which follows and the embodiments described therein are provided by way of illustration of an example, or examples, of particular embodiments of the principles of the present invention. These examples are provided for the purposes of explanation, and not limitation, of those principles and of the invention. In the description which follows, like parts are marked throughout the specification and the drawings with the same respective reference numerals.

The invention relates generally to the field of airflow boosting devices. In particular, the invention relates to a booster fan for installation into a vent opening of a duct system in a forced air circulation and delivery system. Although a forced air circulation and delivery system typically installed in a residential building is referenced in the examples that follow, it will be appreciated that the invention is not restricted to such a system in a residential building. A booster fan according to the present invention may be installed in a multicabin cruiser boat, recreation vehicle, for example, or the like where airflow boosting is required or desirable at one or more vents. In an embodiment, the booster fan includes a register plate for covering a vent opening. An opening or openings on the register plate provide an air outlet. A housing is secured to the register plate for enclosing a crossflow fan therein. The crossflow fan is disposed adjacent and spaced from the register plate. The crossflow fan is resiliently mounted to the housing. A motor is resiliently connected to the crossflow fan in a driving relation. The housing also has an aperture for providing an air inlet communicating with the duct system. Preferably, two arcuate air deflection panels are provided in the housing for connecting the air inlet and air outlet to form a guided air passageway.

The crossflow fan has a rotational axis. In its mounted position, the rotational axis is generally parallel to the register plate. The crossflow fan is supported at one end by a bearing. The bearing is disposed in a rubber housing attached to a bearing bracket secured to the housing. The crossflow fan is resiliently connected to and supported by a motor at the other end. The motor is secured to the housing, for example, through a mounting bracket.

A control box, containing a control circuitry for selectively energizing the motor, is disposed adjacent the housing. A temperature sensor, disposed in an airflow path downstream from the crossflow fan, may be provided for detecting temperature in the airflow path and selectively energizing the motor by providing an input signal to the control circuitry. Preferably, the control box is electrically isolated from the housing.

Figure 2:
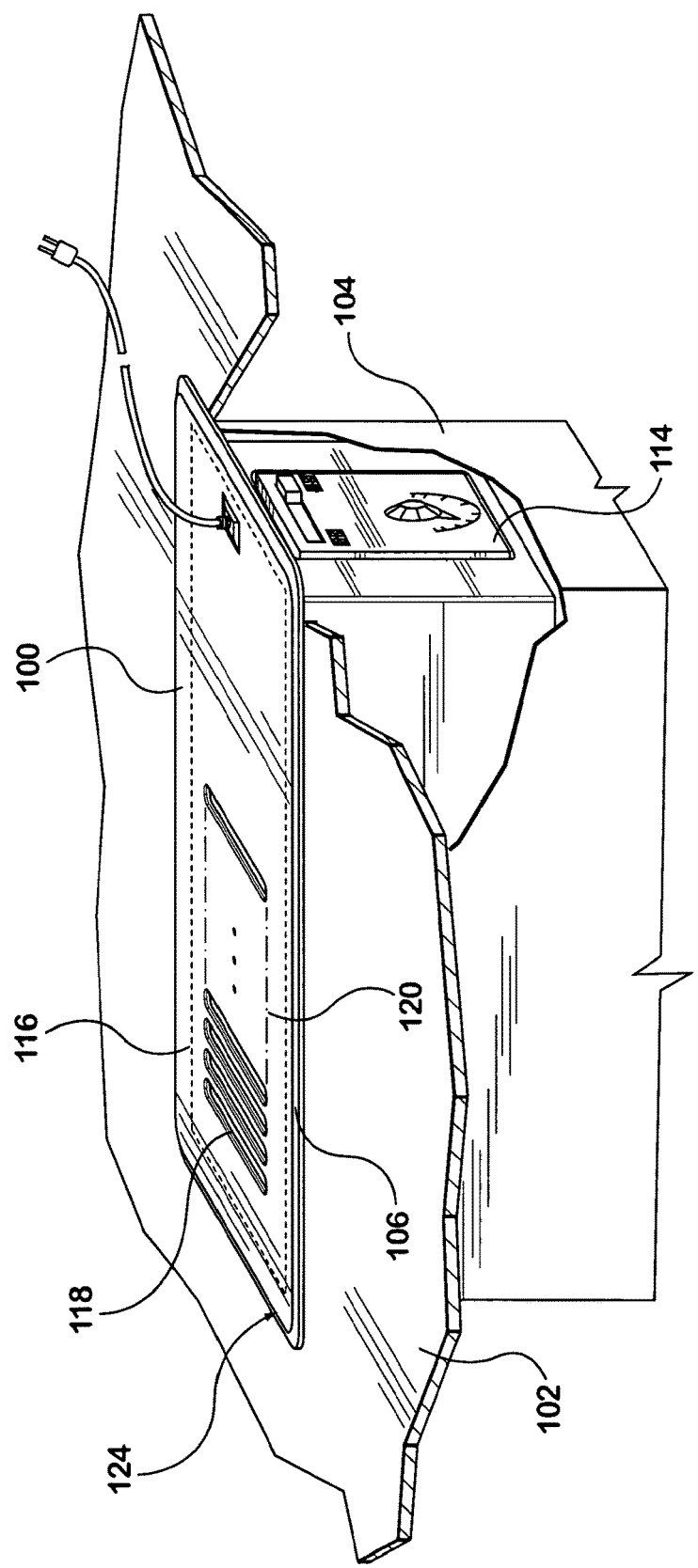
FIG. 2 shows the booster fan shown in FIG. 1 in an installed position.
Figure 3:
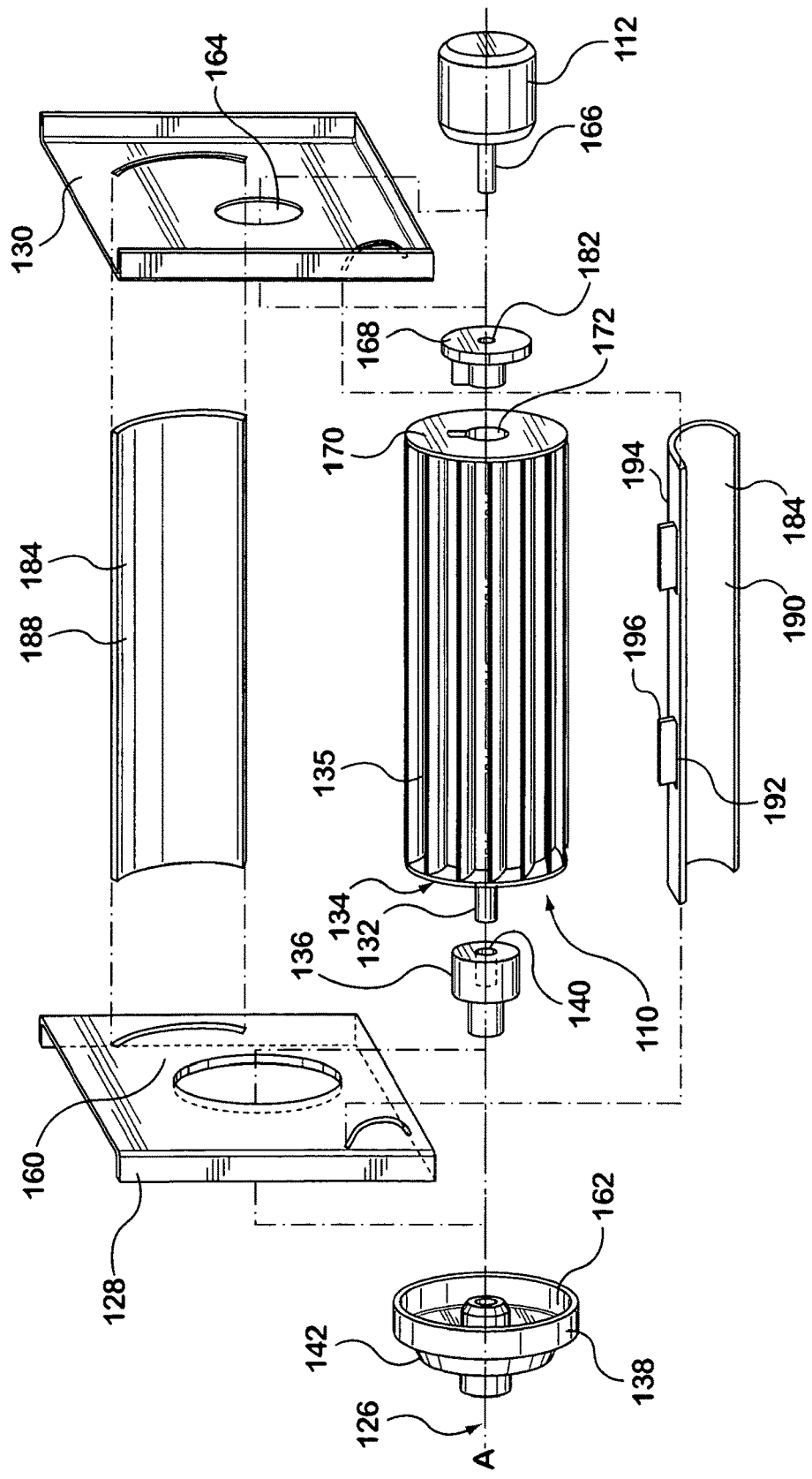
FIG. 3 is an exploded view of the booster fan shown in FIG. 1, with several parts removed to more clearly show its internal structure.

Referring to FIGS. 1-3, there is shown a booster fan, generally indicated as 100. FIG. 1 is a perspective view of a booster fan 100 in accordance with an embodiment of the present invention. FIG. 3 is an exploded view of the booster fan 100 shown in FIG. 1, with a few components removed to more clearly reveal its internal structure. FIG. 2 shows the booster fan 100 in an installed position, with cutouts in floor covering 102 to show the fan 100 and a duct 104. Broadly speaking, the booster fan 100 has a register plate 106, a housing 108 secured to the register plate 106, a crossflow fan 110 disposed inside the housing 108, a motor 112 rotationally connected to the fan 110 and a control box 114 disposed adjacent the motor.

The register plate 106 is generally flat and typically has a rectangular shape. The register plate is shaped and sized so it can completely cover a vent opening 116 (shown in dashed lines in FIG. 2). Housing 108 is suitably dimensioned, i.e., smaller than the vent opening, so that it can pass through the vent opening 116 and be received in the space below floor covering 102. A vent opening in a residential building in North America generally has a number of typical (or standard) sizes. One common size is 4 inches by 10 inches (or about 10 cm by 26 cm). The register plate in one embodiment is about 5¾ inches by 11½ inches (or about 13.5 cm by 28.5 cm) so it can completely cover such a vent opening. Of course, register plates of other sizes or other shapes can also be produced to cover vent openings of other sizes or shapes.

The register plate has a number of elongated openings 118 spaced along its longitudinal dimension. These elongated openings 118 are sized and arranged so that they provide a sufficiently large air outlet 120 without unduly reducing the strength of the register plate. In general, these elongated openings define an air outlet 120 (a rectangular shape illustrated in dot-dashed lines) for boosted airflow to exit therefrom into the environment. Louvers (not shown) may be provided for adjusting direction or volume of out-flowing air.

A fan 110 is disposed adjacent to and spaced from the undersurface 122 of the register plate, the upper surface 124 of the register plate being a surface facing upwardly or outwardly when the register plate is installed over a vent opening. The fan 110 is a crossflow fan, having a rotational axis A 126. A bearing housing bracket 128 and a motor mounting bracket 130 are secured to the register plate for supporting the fan. When the crossflow fan 110 is in its mounted position, the rotational axis A is generally parallel to the register plate 106.

Referring to FIG. 3, the crossflow fan 110 has two end support members, such as two end discs, and a number of fan blades extending between and secured to the end discs. On the bearing end, there is a bearing end disc 134, extending from which is a shaft 132 to be rotationally supported in a bearing. On the other end, adjacent a motor, there is a motor end disc 170. The motor end disc 170 has a connector hole 172 defined therein for receiving a motor connector 168, which in turn connects the crossflow fan 110 to the motor 112. The size of the fan area (defined by the diameter of the fan's end discs and the length of its blades) is such that the interior space of the housing is maximally utilized. In one embodiment, the fan covers a generally rectangular area that is significantly larger than 50% of the vent opening 116. As will be appreciated, because of the relatively large coverage, fan speed does not need to be very high, which helps reducing noise.

Fan blades 135 are generally uniformly distributed angularly and at about equal distance from the central axis of the fan 110. For improved efficiency, fan blades are inclined, i.e., oriented at an angle $\alpha$ with the radial direction and inclined toward the direction of rotation of the fan (labeled as "C3" in FIG. 7). To further improve fan's efficiency, each fan blade is curved. In one embodiment, 22 fan blades are arranged on a circle, each blade inclined at an inclination angle $\alpha$ of about 20°. The circle has a diameter $\phi$ of about 3.5 cm. The blades are made of a metal, such as aluminum. Each blade is formed from a blank of about 1 cm by 13 cm in size and curved with a curvature radius R of about 5 cm. It will be understood that other inclination angles $\alpha$, circle diameter $\phi$, number and surface area of fan blades, and other blade curvature radius R are also possible.

On one end of the fan, the crossflow fan has a support shaft 132 extending from a bearing end disk 134. The shaft 132 is substantially aligned with the rotational axis 126 of the fan. The shaft 132 is stabilized and rotatably supported by a bearing 136, which in turn is hosted by a rubber bearing housing 138 that is attached to the bearing housing bracket 128. The bearing 136 is formed of synthetic resin, by injection molding, for example. As shown in FIG. 3, and more clearly in FIGS. 4 and 5, the bearing 136 has a generally cylindrical shape with a central insert hole 140 for receiving the shaft 132 of the fan. Preferably, the surface of the central insert hole 140 is smooth and has a high degree of hardness. The shaft 132 also has a smooth surface and a precise finish to ensure a precise fitting between the shaft 132 and the central insert hole 140. The diameter of the central insert hole 140 is only slightly larger than that of the shaft 132. As such, the shaft 132 can rotate freely inside the central insert hole 140 but without discernible lateral movement. Such a precise fitting helps reducing noise and vibration.

According to one design, the bearing 136 is formed of a hard resin or thermoplastic material, such as nylon. A bearing made of such a synthetic resin material generally provides high degree of hardness, wear-resistance and a low coefficient of friction. Alternatively, the bearing 136 may be formed of metal, such as steel or copper, or any other suitable material. Of course, as will be appreciated, a bearing made of other materials may also be coated with a suitable surface material so that the surface of the bearing 136 is sufficiently smooth, wear-resistant and has low friction.

The bearing 136 is supported elastically in the rubber bearing housing 138. The rubber bearing housing 138 has the shape of a generally round bowl 142 that has a bottom 144, a sidewall 146 connected to the bottom and a brim 148. In the central region 150 of the bottom 144, there is formed a bulge in the nature of a raised column 152 with a receiving hole 154. The bearing housing 138 receives the bearing 136 tightly inside the receiving hole 154. The outer profile of the bearing 136 includes a shoulder 155. An interior shoulder, or step 156, is formed inside the receiving hole 154 so that shoulder 155 of the bearing can rest upon the step 156. The raised column 152 is sufficiently flexible near its upper edge 158 to allow the bearing 136, when fitted inside the receiving hole 154, to push the raised column 152 toward the bottom 144 to deform it in such a way that the upper edge 158 of the raised column is deformed downwards toward the bottom 144 and inwards toward the bearing 136 for better gripping of the bearing inside the receiving hole 154. This also provides a gentle biasing in a direction away from the bottom and toward the brim.

Figure 6A:
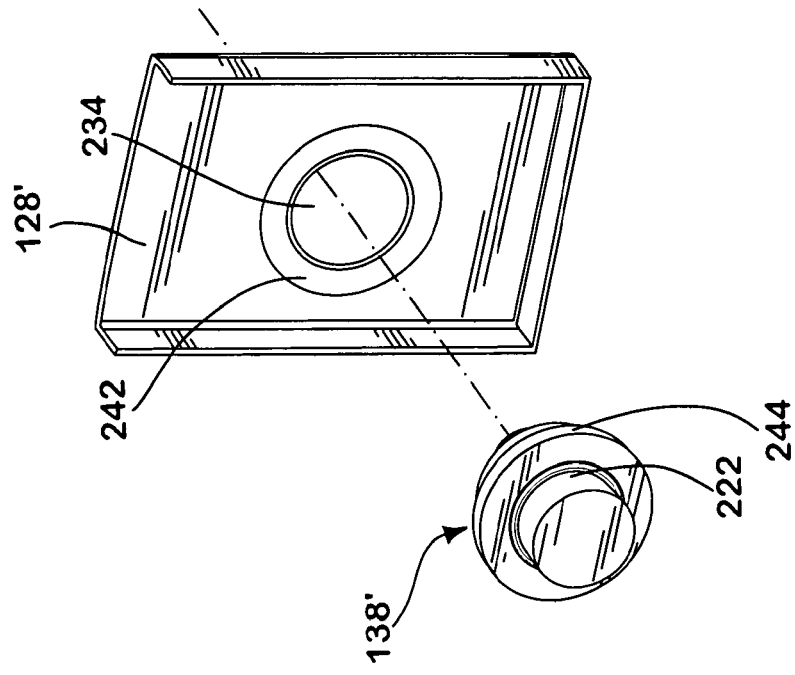
FIG. 6A is an exploded perspective view showing the alternative bearing housing shown in FIG. 4B and an alternative bearing housing bracket for attaching the alternative bearing housing thereto.
Figure 6:
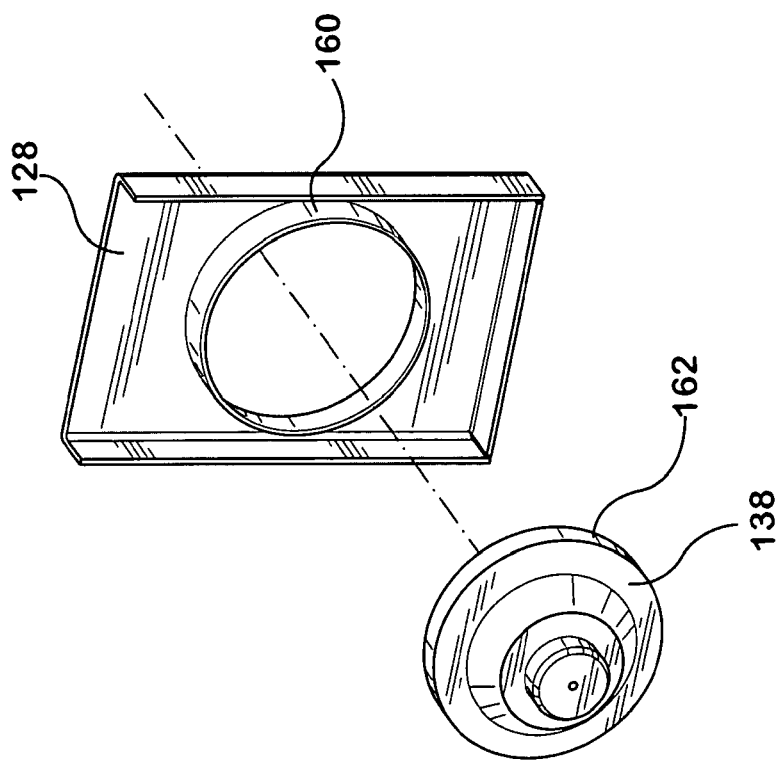
FIG. 6 is an exploded perspective view showing a bearing housing and a bearing housing bracket.

The rubber bearing housing 138 is removeably and resiliently connected to the bearing housing bracket 128 (see FIG. 6). The bearing housing bracket 128 has a central raised ring 160. The rubber bearing housing 138 has a circular skirt 162 extending from the brim 148 of the bearing housing. The circular skirt 162 is sized to be tightly attached to the central raised ring 160. Attaching the circular skirt 162 to the central raised ring 160 connects the rubber bearing housing 138 to the bearing housing bracket 128.

Lubrication may be provided for the bearing 136 to reduce friction between the bearing and the shaft 132. Conveniently, absorbent material may be disposed in the central insert hole 140 for retaining lubricant therein. Alternatively, bearing 136 may have a throughhole 140' (see FIG. 4A). Absorbent material may be disposed in the throughhole 140' towards the rear end 141 of bearing 136, so that interior portion of receiving hole 154 of the bearing housing 138 and the rear portion of the throughhole 140' cooperate to form a reservoir for retaining lubricant.

FIG. 4B shows an alternative embodiment of a rubber bearing housing. The rubber bearing housing 138' shown in FIG. 4B has a generally cylindrical body 222 that has a tapered buldge 224 formed at one end of the body 222. The buldge has its larger end located toward the middle of the housing body and its smaller end near the end of the body 222. A central receiving hole 226 is formed in the buldge 224 and extends into the body 222 for retaining the bearing 136 therein. The receiving hole 226 has an intermediate section 228, dimensioned for tightly retaining the bearing 136. A reservoir section 230, in the nature of a cylindrical hole having a diameter smaller than the intermediate section, may be formed for retaining lubricant for lubricating the bearing. Absorbent material also may be disposed in the reservoir section for retaining lubricant. Optionally, a lip 232 is formed near the edge of the receiving hole 226 to discourage the bearing 136 from being dislodged.

The rubber bearing housing 138' is removably and resiliently connected to a modified bearing housing bracket 128', as illustrated in FIG. 6A. The modified bearing housing bracket has a central hole 234. The rubber bearing housing 138' has a connection section 236, e.g., formed on the buldge 224, that is sized to be tightly and resiliently retained in the central hole 234. Conveniently, the connection section 236 has the form of a circular groove 238, sized to cooperate with the holed housing bracket 128' to discourage axial movement of the bearing housing 138'. To facilitate installation and to further improve damping of vibration, a gap 240 is formed between the connection section 236 and the body 222. Conveniently, a circular depression 242 may be formed on bearing housing bracket 128', surrounding the central hole 234, to accommodate a shoulder, or step 244, formed by the circular groove 238, thus further discouraging any axial or lateral displacement of the bearing having 138' relative to the bearing housing bracket 128'.

A motor mounting bracket 130, secured to the register plate 106, has a shaft hole 164. A motor mounting support (not shown) is secured to the motor mounting bracket 130. Conveniently, the mounting support has a central through hole defined therein, aligned with the shaft hole 164 to allow a motor spindle 166 to pass therethrough when the motor 112 is secured to the motor mounting bracket 130.

Figure 7:
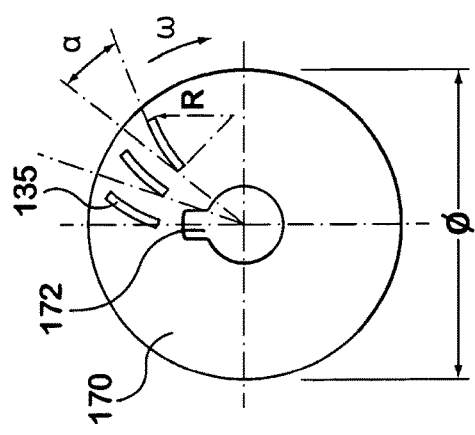
FIG. 7 is a plan view of a motor end disc of the crossflow fan shown in FIG. 3.
Figure 8:
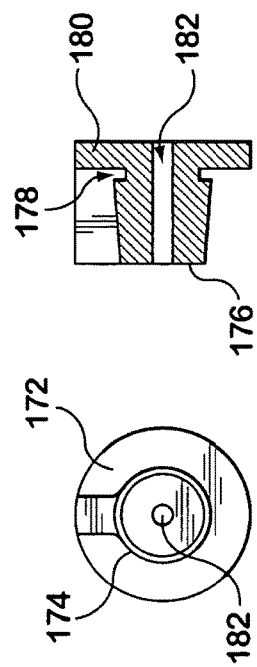
FIG. 8 shows in a top plan view and a side sectional view a motor connector for connecting a motor spindle to the motor end disc shown in FIG. 7.

The other end of the crossflow fan 110 is connected to and rotated by motor 112, which is secured to the housing. Referring to FIG. 3, motor spindle 166 is resiliently connected to the crossflow fan 110 via an elastomeric connector 168. The connector may be made of rubber or similar materials, which provides sufficient elasticity and sufficiently deformable, but not too deformable as to be unable to rotate the crossflow fan 110. The crossflow fan 110 has a motor end disc 170 at the motor end of the fan. As shown in FIGS. 3 and 7, the motor end disc 170 has a connector hole 172 for receiving the elastomeric connector 168. The connector hole 172 has a non-circular shape to prevent the connector 168 from rotating relative to the connector hole 172. As shown in FIG. 3 and more clearly in FIG. 8, the elastomeric connector 168 has an exterior profile 174 matching the shape of the connector hole 172. The elastomeric connector 168 is forcibly inserted into the connector hole 172. To prevent the elastomeric connector 168 from accidentally slipping out of the connector hole 172, the exterior profile of the elastomeric connector is generally tapered longitudinally towards its distal end 176 and is provided with a grove 178 near its base 180. When the elastomeric connector 168 is being forcibly pushed through the connector hole 172, the exterior profile is slightly deformed, i.e., compressed radially inwardly, to allow the connector 168 to pass through the connector hole 172. The connector 168 has a central spindle hole 182. When the connector 168 rests inside the connector hole 172, the central spindle hole 182 is generally aligned with the rotational axis 126 of the fan. The motor spindle 166 is forcibly inserted in the spindle hole 182 and is kept rotationally connected to the connector 168 by friction between the spindle and the spindle hole surface and a compression force applied by the connector 168 on the motor spindle 166.

The shaft 132 supported in this manner (and the crossflow fan) is slightly biased toward the motor end of the crossflow fan and in a direction along the rotational axis A. Both the bowl 142 of the rubber bearing housing and the deformed raised column 152 provide the bias, gently urging the crossflow fan toward the motor. As will be appreciated, a motor spindle or its rotor generally tends to have some free play along its rotation axis. Such a free play tends to contribute to the overall noise level of the booster fan. Gently urging the crossflow fan towards the motor, i.e., by providing such a gentle bias toward the motor, tends to reduce and may eliminate the noise caused by such a free play. Additionally, the resilient support provided at both ends of the crossflow fan provides radial, axial and torsional damping and further absorbs both radial and axial vibrations, caused by misalignment and/or rotation of the fan, for example, and helps reducing noise further.

Figure 10:
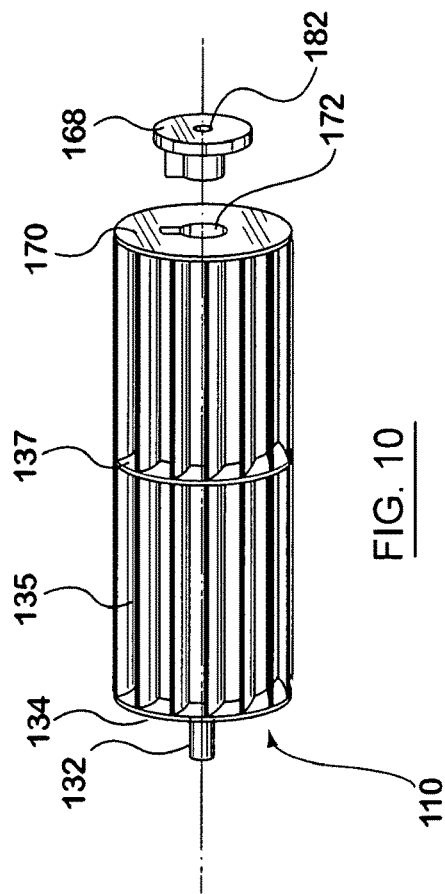
FIG. 10 is an exploded perspective view of a crossflow fan that includes a fan blade support plate.
Figure 10B:
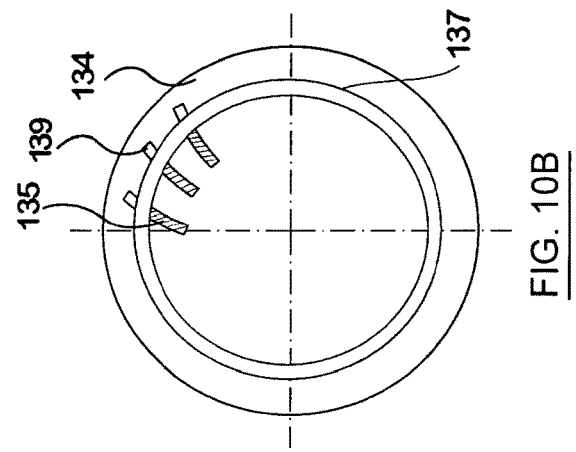
FIG. 10B is a sectional view of a crossflow fan showing a brace ring as a fan blade support member.
Figure 10A:
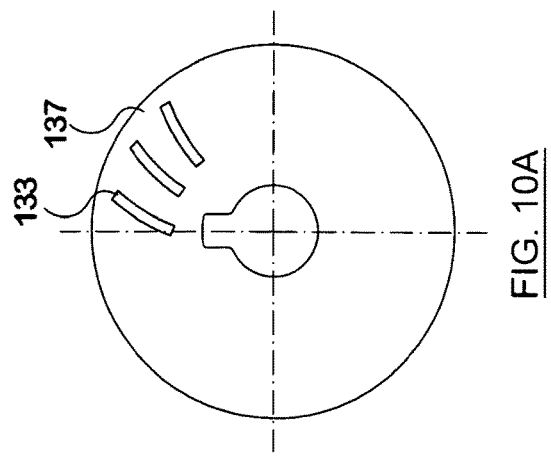
FIG. 10A is a top plan view of a fan blade support plate.

FIG. 10 shows a crossflow fan 110' that has an additional blade support member, such as a blade support plate 137, disposed between end discs, e.g., at a location toward the middle of the fan. The blade support plate 137 connects the blades together and maintains the distance between neighboring blades, thus providing additional support to the fan blades and making the crossflow fan a more rigid structure. Conveniently, blade support plate 137 has essentially the same construction as motor end disc 170 (see FIG. 10A). Curved slots or openings 133 are provided (only three are illustrated) for fan blades to pass therethrough. Each slot 133 is shaped and dimensioned so as to allow a fan blade to pass through while tightly maintaining the blade in place. Although FIG. 10 shows the use of one blade support plate for the fan, disposed near the center, i.e., about equidistance to bearing end disc 134 and motor end disc 170, it will be appreciated that more blade support plates may also be provided, and that it is not necessary for the support plate(s) to be so located as to evenly divide the distance between the motor end disc 170 and the bearing end disc 134. In addition, that the blade support plate has the same construction as the motor end disc is only for convenience, namely manufacturing efficiency, but is not necessary. For example, a blade support plate does not need to have a central hole corresponding to the connection hole 172 of motor end disc 170. The blade support member does not even need to take the form of a plate. It may simply be a brace ring 137' that is sized to tightly bind all (or some) blades together, e.g., by having an appropriately dimensioned inner diameter that is slightly smaller than that of a cylinder defined by the outer (or top) edges of the fan blades, or, if a notch 139 is provided on the outer edge of each fan blade for receiving and retaining the brace ring, smaller than that of a cylinder defined by the bottom edges of the notches 139 on the fan blades (see FIG. 10B). Alternatively, it may be in the form of a series of weldings that join neighboring blades together. As a result of joining the neighbouring blades (not necessarily opposing blades), the distance between the joined blades tend to be better maintained. The blade support member or members may have any other suitable form or construction to provide the support and binding function so that the end discs, the blades and the blade support member(s) form a more rigid structure. A more rigid crossflow fan helps reducing noise further during operation of the booster fan.

Figure 9:
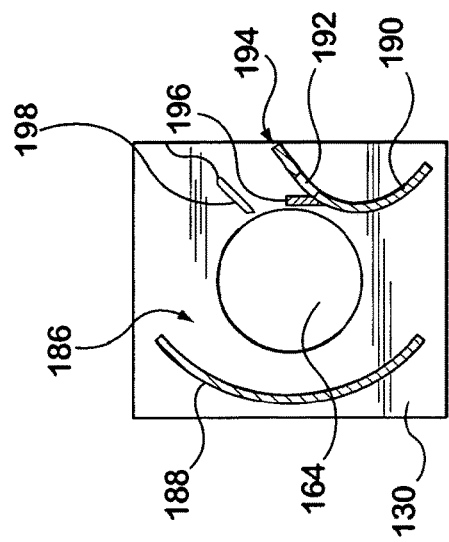
FIG. 9 shows in a cross-sectional view the relative positioning of two air deflection panels; also shown are a bypassing opening and a tab formed on the front panel.

Referring to FIGS. 3 and 9, two air deflection panels, or guidance panels 184 may be provided. Together with the bearing housing bracket 128 and the motor mounting bracket 130, these two guidance panels 184 form an airflow passageway 186 connecting an air inlet and an air outlet. The guidance panels 184 are so positioned so that the airflow passageway 186 is generally diverged toward the air outlet. The crossflow fan is disposed in the airflow passageway, so that when the fan is energized, it urges or draws air to flow from the air inlet, moving through the passageway and exiting from the air outlet. Both air guidance panels 184 have a general arcuate profile. The rear panel 188 has a generally less bent than the front panel 190. The rear panel 188 bends toward the crossflow fan 110 to embrace the fan and the front panel 190 bends away from the fan. It is found that such arcuate panels provide smoother airflow and help reducing noise. To further reduce noise, two slits, or bypassing openings 192, are formed in the front panel 190. In one embodiment, two slits are about of the same length and are positioned roughly one third of the width of the front panel from the top lengthwise edge 194. In one embodiment, both guidance panels are made of metal. Conveniently, these slits may be formed by punching through the front panel a shallow, generally U-shaped cut. The resulting metal tongue is then bent away (or bent during the punching process) to form an elongated tab 196 and a bypassing opening 192. The elongated tab 196 is adjacent the bypass opening 192 and forms an angle of about 600 with the surface of the front panel 190. Each elongated tab, in one embodiment, is about 4 cm long and 0.3 cm wide. Of course, other slit/tab-forming techniques, such as stamping, cutting and welding etc. may also be used to form the bypassing openings 192 and the elongated tabs 196.

As can be seen in FIGS. 1 and 2, housing 108 is secured to the undersurface 122 of the register plate. The motor 112 and crossflow fan 110 are enclosed inside the housing. Also enclosed inside the housing is a control box 114. The housing 108 shown in FIG. 1 has a fixed portion 198 and a removable portion 200. The fixed portion 198 has two end walls and a rear wall connecting and extending between the end walls. The control box 114 is disposed near one end wall 202, which has a central opening 204 for exposing control knobs and switches of the control box. The removable portion 200 is bent from a sheet blank to form a front wall 206 and a bottom wall 208. When the removable portion 200 is secured to the fixed portion 198, the motor, the fan and the control box 114 are entirely enclosed in the housing 108. A number of longitudinal slots 210 are formed on the bottom wall 208, defining an air inlet 212.

The control box 114 houses a control circuitry (not shown) for selectively energizing the motor 112. The control circuitry can be any conventional type, triggered by a sensor signal, or may be otherwise programmable. The control circuitry is responsible for selectively energizing the motor. Different triggering signals, generated according to different triggering conditions may be used. For example, it may be temperature-based, as will be described in greater detail below. It may also be time-based, for example, synchronized with, or at a pre-selected delay after the energizing of the air blower of the central air circulation and delivery system. It may also be based on a combination of temperature sensing and time delay, or any other suitable criteria.

In one embodiment, a temperature sensor 198 (shown in FIG. 9), disposed in the housing 108, e.g., at a location downstream of the fan, detects a temperature in the airflow passageway 186. The control circuitry is triggered, or activated, when the detected temperature rises or drops by a user selected amount. For example, a threshold value may be set at 5° C. When the central air circulation and delivery system is delivering cold air, the air temperature inside the duct 104, and therefore the airflow passageway, will decrease. When the detected temperature drops by 5° C., indicating that the blower fan has started running and delivering cold air, the control circuitry is triggered. The motor 112 is then energized. The control circuitry turns off the motor after the air temperature returns to the triggering threshold. To increase efficiency, the control circuit may keep the motor 112 running for a fixed amount of time (e.g., 2 minutes) after the temperature returns to the triggering threshold. When the hot air is being delivered, the control circuit is triggered when the detected temperature rises by 5° C., and turns off the motor when the temperature returns to the threshold or lower. Of course, a user may select any other suitable threshold, not necessarily 5° C. Alternatively, the control circuit may be configured to trigger when the detected temperature crosses a fixed threshold temperature, such as below 18° C. during summer and above 25° C. during winter or any other suitable or desirable temperatures. As shown in FIG. 1, a hot/cold switch 214 controls whether the booster fan is to boost hot or cold air. A temperature or sensitivity knob 216 allows a user to set the threshold value, i.e., the threshold at which the booster fan is to be energized.

The control circuitry and the motor may be operated using household electricity, in which case an electricity cord is provided for connecting to a wall electricity outlet, or using standard batteries, in which case space for installing batteries is provided in the control box. For safety, the control box, at least the control circuitry, is electrically isolated from the housing.

Various embodiments of the invention have now been described in detail. Those skilled in the art will appreciate that numerous modifications, adaptations and variations may be made to the embodiments without departing from the scope of the invention. Since changes in and or additions to the above-described best mode may be made without departing from the nature, spirit or scope of the invention, the invention is not to be limited to those details but only by the appended claims.

What is claimed is:

1. An airflow boosting assembly for installation in a vent opening of a duct system in a forced air circulation and delivery system, said airflow boosting assembly comprising:
 a housing, said housing being dimensioned to be smaller than the vent opening for passing therethrough;
 a register plate for covering said vent opening, said register plate having defined therein an air outlet;
 said housing having an air inlet spaced from said air outlet;
 a crossflow fan disposed in said housing and between said air inlet and said air outlet, said crossflow fan having a rotational axis, said crossflow fan being oriented such that said rotational axis is generally parallel to said register plate, said crossflow fan having two end support members and a plurality of fan blades extending between and secured to said two end support members and a rigid blade support member disposed between said two end support members, said end support members and said rigid blade support member joining said fan blades at a location between said end support members to form a rigid structure;
 an elastomeric motor connector;
 a motor secured to said housing, said motor being connected to said crossflow fan in a driving relation through said elastomeric motor connector;
 an elastomeric bearing housing attached to said housing and a bearing resiliently housed in said bearing housing;
 said crossflow fan having a shaft rotationally supported in said bearing, said bearing housing biasing said crossflow fan toward said motor along a direction generally parallel to said rotational axis; and
 a control circuitry for selectively energizing said motor, wherein said elastomeric bearing housing has a bowl-like profile, said bowl-like profile having a raised column formed on a bottom region of said bowl-like profile, said raised column having a receiving hole for receiving said bearing, said raised column being deformed to grip said bearing when said bearing is urged toward said bottom region.

2. The airflow boosting assembly of claim 1, wherein said motor having a spindle, said spindle being received in said motor connector, said motor connector providing damping for minimizing radial, torsional and axial vibrations of said crossflow fan.

3. The airflow boosting assembly of claim 1, wherein said air outlet has an effective elongated shape and said crossflow fan extends longitudinally along substantially the entire length of said elongated shape.

4. The airflow boosting assembly fan of claim 1, wherein said control circuitry includes a temperature sensor, said control circuitry energizing said motor when said temperature sensor detects a temperature change in said housing within a pre-selected range.

5. The airflow boosting assembly of claim 1, wherein the blade support member is a plate, the plate having a plurality of blade openings, each of the blade openings being dimensioned to permit each respective blade to pass therethrough and to rigidly maintain distance between neighboring fan blades.

6. The airflow boosting assembly of claim 1, wherein the blade support member is a brace ring, the brace ring being sized to bind the plurality of fan blades and to rigidly maintain distance between neighboring fan blades.

7. The airflow boosting assembly of claim 1, wherein the blade support member comprises a series of weldings, each welding rigidly joining a pair of neighboring fan blades to rigidly maintain distance between the neighboring fan blades.

8. An airflow boosting assembly for installation in a vent opening of a duct system in a forced air circulation and delivery system, said airflow boosting assembly comprising:
 a register plate for covering said vent opening, said register plate having defined therein an air outlet;
 a housing, said housing having a bottom wall spaced from said register plate, said bottom wall having defined therein an air inlet, said housing being dimensioned to be smaller than the vent opening for passing therethrough;
 a crossflow fan disposed in said housing and between said air inlet and said air outlet, said crossflow fan having a rotational axis, said crossflow fan being oriented such that said rotational axis is generally parallel to said register plate, said crossflow fan having a motor end disc, a bearing end disc, a plurality of fan blades extending between and secured to said motor end disc and said bearing end disc, a rigid blade support member disposed between said motor end disc and said bearing end disc, said rigid blade support member connecting neighboring fan blades to each other at a location between said motor end disc and said bearing end disc and maintaining distance between neighboring fan blades, and a shaft extending from said bearing end disc;

a motor secured to said housing, said motor having a spindle;

an elastomeric motor connector, said elastomeric motor connector resiliently connecting said spindle to said motor end disc in a driving relation;

a bearing having an insert hole for receiving said shaft;

a bearing housing bracket secured to said housing;

an elastomeric bearing housing resiliently attached to said bearing housing bracket;

said bearing resiliently received in said bearing housing, said bearing housing biasing said crossflow fan toward said motor along a direction generally parallel to said rotational axis; and a control circuitry for selectively energizing said motor, wherein said bearing housing has a bowl-like profile, said bowl-like profile having a raised column formed on a bottom region of said bowl-like profile, said raised column having a receiving hole for receiving said bearing, said raised column being deformed to grip said bearing when said bearing is urged toward said bottom region.

9. The airflow boosting assembly of claim 6, wherein said bearing is made of a hard synthetic resin material and said insert hole has a low friction surface.

10. The airflow boosting assembly of claim 6, wherein said motor end disc has a non-circular opening defined therein for receiving said motor connector, said motor connector having an external profile matching said non-circular opening.

11. The airflow boosting assembly of claim 6, further comprising a first arcuate guidance panel and a second arcuate guidance panel, said first and second guidance panels being disposed between said register plate and said bottom wall to form a guided air passageway between said air inlet and said air outlet.

12. The airflow boosting assembly of claim 9, wherein said first guidance panel is curved to embrace said crossflow fan and said second guidance panel is curved away from said crossflow fan.

13. The airflow boosting assembly of claim 9, wherein said second guidance panel having a bypass opening formed therein and a tab disposed adjacent an edge of said bypass opening for guiding air passing therethrough.

14. The airflow boosting assembly of claim 6, wherein the blade support member is a plate, the plate having a plurality of blade openings, each of the blade openings being dimensioned to permit each respective blade to pass therethrough and to rigidly maintain distance between neighboring fan blades.

15. The airflow boosting assembly of claim 6, wherein the blade support member is a brace ring, the brace ring having a diameter that is dimensioned so as to tightly bind the plurality of fan blades and to rigidly maintain distance between neighboring fan blades.

16. The airflow boosting assembly of claim 6, further comprising a temperature sensor electrically connected to said control circuitry and disposed in said housing, wherein said control circuitry includes adjustment means for selecting a temperature threshold for triggering said control circuitry thereby energizing said motor.

17. The airflow boosting assembly of claim 6, wherein said control circuitry includes adjustment means for selecting a time delay for energizing said motor.

18. The airflow boosting assembly of claim 6, wherein the blade support member comprises a series of weldings, each welding rigidly joining a pair of neighboring fan blades to rigidly maintain distance between the neighboring fan blades.

* * * * *